United States Patent [19]

Byrne

[11] Patent Number: 5,533,099
[45] Date of Patent: Jul. 2, 1996

[54] MULTI-MODE RADIO TELEPHONE

[75] Inventor: John D. Byrne, Shepperton, United Kingdom

[73] Assignee: Nokia Mobile Phones Ltd., Salo, Finland

[21] Appl. No.: 407,682

[22] Filed: Mar. 21, 1995

[30] Foreign Application Priority Data

Mar. 22, 1994 [GB] United Kingdom ............... 9405659

[51] Int. Cl.⁶ .................................................. H04Q 7/38
[52] U.S. Cl. .................. 379/58; 379/59; 379/61; 370/95.3
[58] Field of Search ................... 379/58, 59, 60, 379/61; 370/95.1–95.3

[56] References Cited

U.S. PATENT DOCUMENTS

| | | | |
|---|---|---|---|
| 3,836,721 | 9/1974 | Sugioka. | |
| 4,989,230 | 1/1991 | Gillig et al. | 379/59 |
| 5,127,042 | 6/1992 | Gillig et al. | 379/59 |
| 5,212,684 | 5/1993 | MacNamee et al. | 379/61 |
| 5,260,988 | 11/1993 | Schellinger et al. | 379/59 |
| 5,367,558 | 11/1994 | Gillig et al. | 379/59 |
| 5,392,462 | 2/1995 | Komaki | 379/59 |
| 5,442,680 | 8/1995 | Schellinger et al. | 379/58 |
| 5,463,674 | 10/1995 | Gillig et al. | 379/59 |

FOREIGN PATENT DOCUMENTS

| | | |
|---|---|---|
| 2249922 | 5/1992 | United Kingdom. |
| 2270237 | 3/1994 | United Kingdom. |

*Primary Examiner*—Dwayne D. Bost
*Attorney, Agent, or Firm*—Perman & Green

[57] ABSTRACT

A radio telephone (200) is operable in a cordless telephone system or in a cellular telephone system, in each of which reception and transmission occur in time slots. A microprocessor (210) of the telephone has an additional control entity (212) which predicts temporal overlap or coincidence of receive and transmit slots in the two systems. This information is used either to alter the time slots to avoid the predicted overlap or coincidence or to reduce the effect of interference, for example by muting certain slots or repeating signals in previous slot or slots.

10 Claims, 4 Drawing Sheets

MULTI-MODE RADIO TELEPHONE

FIELD OF INVENTION

The present invention relates to a radio telephone, and in particular to a radio telephone operable in more than one system and to a method of operating such a radio telephone.

BACKGROUND TO INVENTION

Over the last ten years there has been a rapid growth in the use and availability of radio telephone systems. As part of this growth there has been a proliferation of different types of radio telephone system, offering the user a variety of services, geographical coverage and cost. Many of these different radio telephone systems cover the same, or a part of the same, geographical area as each other. Typically, different radio systems operate on different radio frequencies, utilise different modulation techniques, signalling techniques and intra-system protocols etc. to each other. Thus, a radio telephone designed for one system is generally unable to be used on another system. Thus if a user wishes to have access to more than one system it is necessary to have either more than one radio telephone or a radio telephone capable of operating in more than one system. Having more than one radio telephone is inconvenient for the user. Known radio telephones capable of operating in more than one system typically consist of little more than two separate telephones combined in a single housing. The preference for operating in a particular system is user defined as disclosed in U.S. Pat. No. 4,989,230.

A particularly useful and appropriate environment for multi-mode radio telephones is the recently available cellular and cordless telephone systems. In the prior art, cordless telephones are typically used in the home and office to allow the user to place and receive calls at any point throughout the house via an RF link with a home base station located within the house or office. Such cordless telephones are connected via the home base station to the user's telephone landline which is in turn connected to the Public Switched Telephone Network (PSTN). Further, there are known second generation cordless telephone systems such as CT-2 or DECT which are digital systems. Such CT-2 or DECT systems extend beyond conventional domestic operation of cordless telephones by allowing the user to establish an RF link between a CT-2 or DECT radio telephone and a base station in a more publicly accessible location, eg outside the user's home, a railway station, shopping mall or airport. Such base stations are known as telepoint base stations and are linked to the PSTN in much the same way as a home base station. Some cordless (and in particular DECT) radio telephones, are now able to receive calls via telepoint base stations whereas hitherto they were only able to place them. A description of such a system can be found in PCT International Patent Application WO 92/03006. Thus, placing and receiving calls whilst geographically roaming is possible in cordless telephone systems.

However, cordless telephone systems are generally low power systems and each base station provides telecommunications within only approximately a 150 meter radius of the base station, dependent upon the terrain and any manmade objects which could interfere with signalling between a cordless telephone handset and the base station. Such systems are generally only used in areas of high user density and thus tend to be limited to urban areas. This clearly restricts the geographical mobility of a CT-2, DECT or the like cordless telephone user. In the prior art there are known so-called cellular radio telephone systems having base stations which cover a wide geographical area (cell), eg 35 km diameter. However, in urban areas where the user density is high the cells are much smaller and operate at lower powers to facilitate frequency re-use thereby increasing the communication channel density.

Cellular systems have advantages over cordless systems since they allow a user to place and receive calls over a large area. Additionally they are suitable for use in moving vehicles. This is because cellular telephone systems have sophisticated handover procedures to facilitate switching between cells as a user's vehicle crosses from one cell to another. This ensures continuity of service and is particularly important during a call. However, the cost of a cellular telephone call is significantly greater than the cost of a cordless telephone call, since cordless telephone calls are made by way of the user's land line PSTN link and cost the same as landline calls, whilst cellular telephone calls are made by way of expensive cellular base stations and cellular switching equipment and cost much more than land line telephone calls.

In order for a user to be able to utilise both cellular and cordless telephone systems via a single radio telephone handset a so-called cellular cordless telephone (CCT) has been proposed in U.S. Pat. No. 4,989,230.

Time Division Multiple Access (TDMA) telephones divide time into a number of slots during which the telephone receives, transmits or does neither. A single mode telephone can therefore arrange never to have receive while it is transmitting and this has the benefit that self-interference of the transmit channel into the receive channel is avoided. With a multi-mode radio telephone this condition may no longer be true, as interference between modes becomes possible. The invention aims to solve this problem.

BRIEF SUMMARY OF THE INVENTION

According to one aspect of the invention there is provided a radio telephone operative in two telephone systems in each of which transmission and reception occur in time slots, the radio telephone comprising first means for predicting the temporal overlap or coincidence of receive and transmit slots in the two systems and second means, responsive to the first means, for avoiding or reducing the interference consequent upon the predicted overlap or coincidence.

Preferably, the radio telephone operates in TDMA and may itself be responsible for making channel selection, as in DECT (Digital European Cordless Telephone).

The second means may be operative to alter the time slots in which transmission or reception occurs to avoid the incidence of overlap or coincidence. Alternatively, the second means may utilise knowledge of the predicted overlap or coincidence to reduce the extent of interference. For example, the second means may be operative to effect muting in time slots during which interference is predicted to occur, or may be operative to repeat signals in a previous slot or slots.

According to another aspect of the invention there is provided a method of operating a radio telephone which is operative in two telephone systems in each of which transmission and reception occur in time slots, comprising predicting the temporal overlap or coincidence or receive and transmit slots in the two systems and using the prediction to avoid or reduce the interference consequent upon, the predicted overlap or coincidence.

3

The two telephone systems are preferably a macro-cellular system (eg so-called "cellular") and a micro-cellular system (eg so-called "cordless") respectively.

DETAILED DESCRIPTION OF EMBODIMENTS OF THE INVENTION

An embodiment of the invention will now be described, by way of example, with reference to the accompanying drawings.

Figure 1:
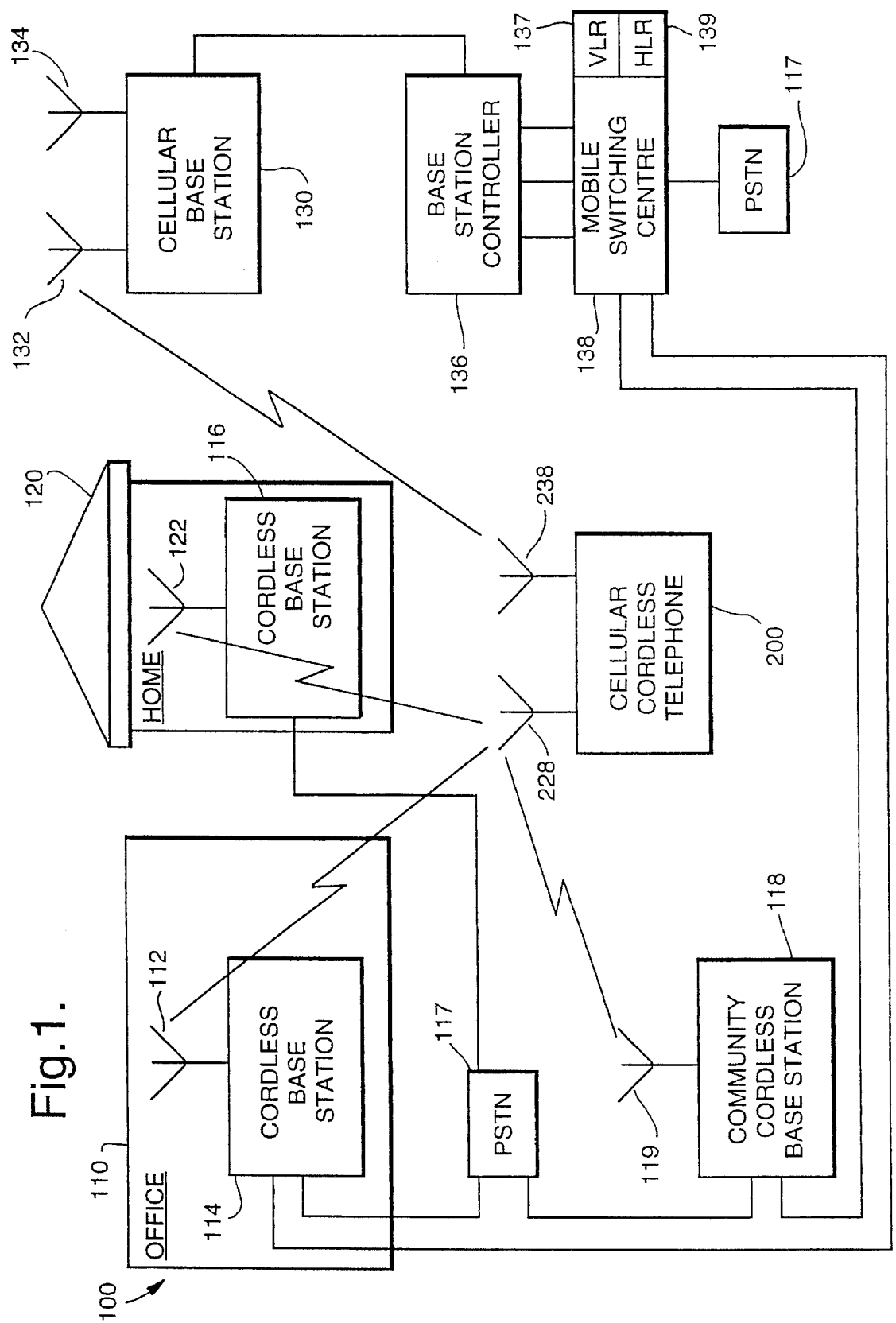
FIG. 1 is a block diagram of two telephone systems (one cellular and the other cordless) and a cellular cordless telephone according to the invention.

FIG. 1 illustrates a block diagram of cellular and cordless telephone systems 100 with either of which a cellular cordless telephone 200 can communicate. In practice there will be a plurality of telephones 200. The systems include a Public Switched Telephone Network (PSTN) 117, connected by landlines to cordless base stations 114, 116 and 118 having respective landline telephone numbers and respectively located in an office building 110, domestic residence 120 and some other geographical location.

The cordless base stations 114, 116 and 118 communicate with the cellular cordless telephone (CCT) 200 via respective antennas 112, 119 and 122. The antennas 112, 119 and 122 may be implemented as any sort of suitable antenna such as a whip antenna, helical antenna or printed antenna. The cordless base stations 114 and 116 may be conventional cordless base stations. A cordless base station 118 is a community cordless base station and such base stations may be located throughout an urban area, or common user area such as a railway station, shopping mall or airport, for providing a shared telephone service to CCTs 200. In such a case, the cordless base station 118 may include additional equipment not usually found in conventional cordless base stations for billing calls to a telephone number of the CCT 200.

Also connected through telephone landlines to the PSTN 117 is the mobile switching centre (MSC) 138 associated with Base station controller(s) (BSC) 136 for controlling a cellular base station(s) 130. The cellular base station 130 comprises both a receive antenna 132 and a transmit antenna 134 for communicating with CCTs 200.

Figure 2:
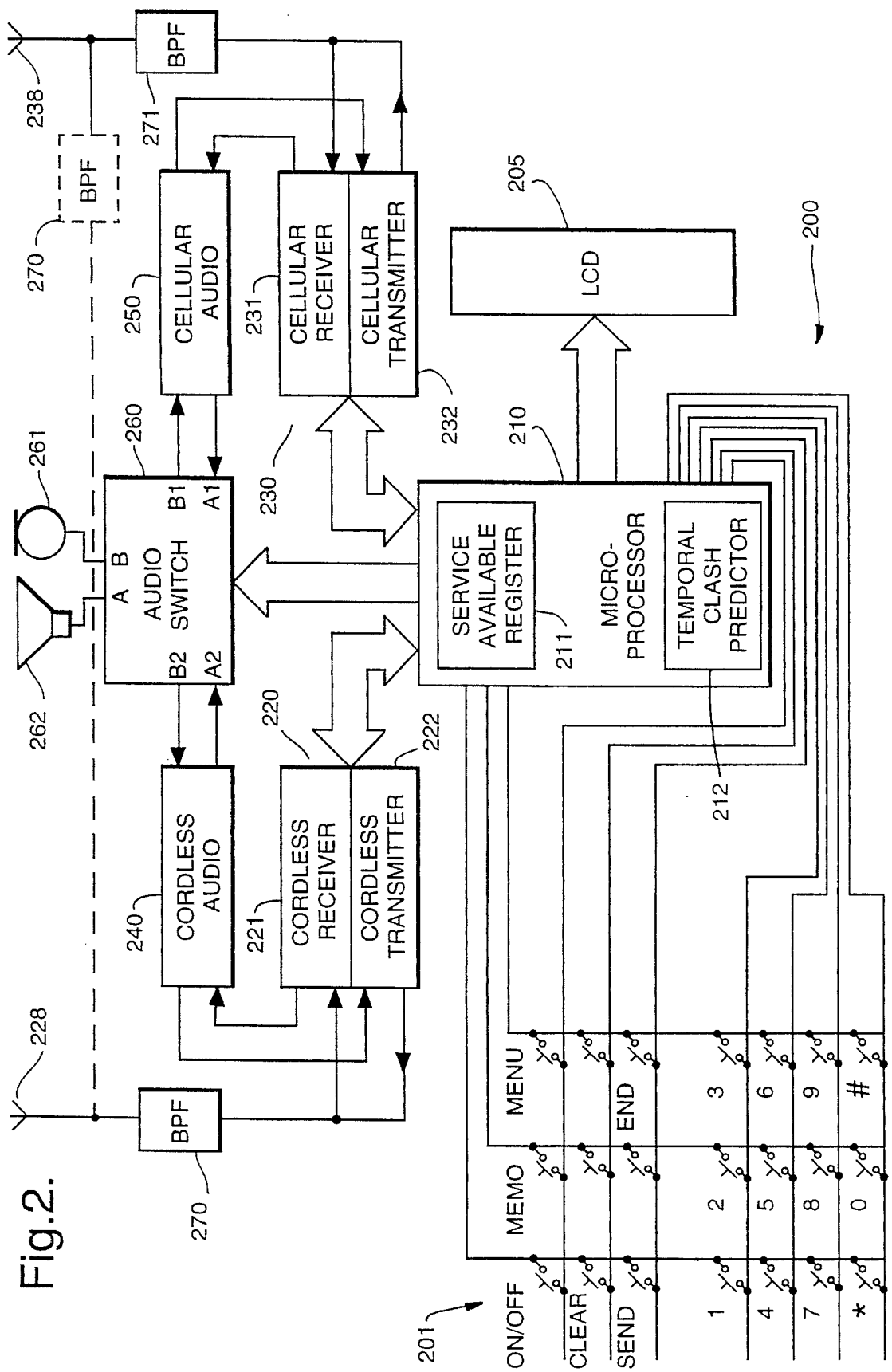
FIG. 2 is a block diagram of the cellular cordless telephone of FIG. 1.

The CCT 200 may be a mobile unit installed in a vehicle, a so called transportable unit, or a hand-held portable unit. The CCT 200 comprises an antenna 228 for cordless communication and an antenna 238 for cellular communication. The CCT 200 may alternatively comprise a single antenna 238 for both cellular and cordless communication and arranged as illustrated in FIG. 2 by the dotted line 272. Typically in the UK cordless telephone systems operate in frequency bands DECT 1.88–1.9 GHZ and CT2 864–868 MHz and cellular telephone systems in frequency bands 890–905 MHz and 935–950 MHz (TACS) or 905–915 MHz and 950–960 MHz (GSM).

FIG. 2 illustrates a detailed block diagram of an embodiment of a CCT 200 in accordance with the present invention. The CCT 200 comprises a cellular telephone transceiver 230 and antenna 238, a cordless telephone transceiver 220 and antenna 228, a microprocessor 210, keypad 201, display 205, audio switch 260, microphone 261 and speaker 262. The microphone 261, speaker 262 and keypad 201 may alternatively be located in a handset separate from the rest of the CCT 200. An alternative embodiment is shown by dashed line 272, in which cordless transceiver 220 and cellular transceiver 230 may be coupled to a single antenna 238 by way of band pass filter (BPF) 270 and a band pass filter (BPF) 271, respectively. The cordless telephone transceiver 220 may be any conventional cordless transceiver. However, it would be advantageous if the cordless telephone transceiver 220 conformed to a common air interface for cordless telephones, since this would facilitate roaming of the CCT 200 between different cordless systems. The cellular transceiver 230 may likewise be any conventional cellular transceiver. The keypad 201, microprocessor 210, display 205 and the like can be any available type, connected and arranged to operate in the CCT 200. The microprocessor 210 includes a Service Available Register (SAR) 221 for storing which radio systems are currently available to the CCT 200.

When operating as a cordless telephone control signals from the microprocessor 210 enable cordless receiver 221 and cordless transmitter 222. The microprocessor 210 also monitors signals from the cordless receiver 221, indicating received signal strength and for detecting receive data, and from the cordless transmitter 222 for sending transmit data. Additionally, the microprocessor 210 monitors control signals from the cordless transceiver 220 for detecting incoming calls (ringing), security codes and broadcast information relevant to the cordless system, and for sending dialling information.

The microprocessor 210 controls the CCT 200 in a similar way when operating as a cellular telephone, but appropriately modified for the signalling protocols and data encryption used in the cellular system. The signalling protocols, data encryption techniques and the like used in respective telephone systems, are well known in the art, and the microprocessor can be arranged to operate in a known manner to effect control of the signals in such systems.

The audio switch 260 is controlled by the microprocessor 210 to link the cordless audio channel 240 or the cellular audio channel 250 to the microphone 261 and loudspeaker 262 as appropriate.

Figure 3:
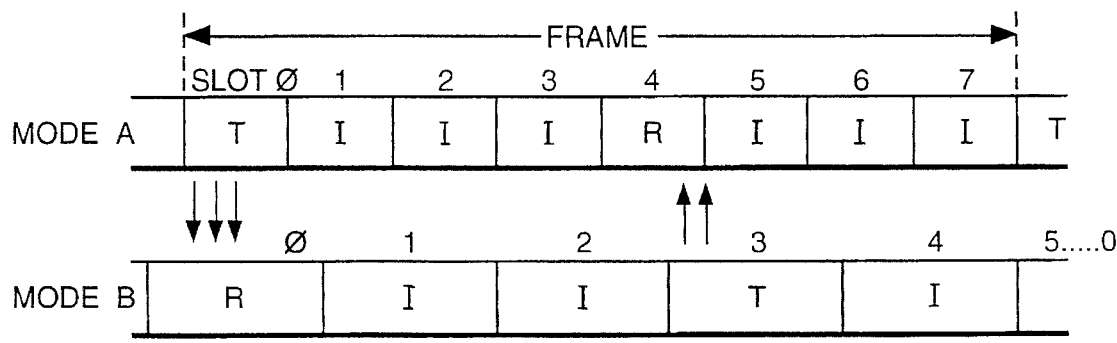
FIG. 3 is a block diagram illustrating how time slot interference can occur.

The CCT 200 operates in TDMA. Being a dual mode telephone, the timing structures of one mode will not be synchronous with the timing structures of the other mode. Therefore, the TDMA slots of one mode will, with the passage of time, "slide across" the TDMA slots of the other mode. This is illustrated in FIG. 3 where the upper row of time slots (marked MODE A) represents the time slots in the cordless mode and the lower row of time slots (marked MODE B) represents the time slots in the cellular mode. In FIG. 3, "T" represents Transmit, "R" represents Receive and "I" represents Idle or Monitor. In the example of FIG. 3, it can be seen that there is partial overlap between T and R slots in slots 0 and 4 of the cordless mode. Hence, interference is likely to occur in these slots, but by recourse to the invention this interference can be avoided or at least minimised.

It will be appreciated that the receive and transmit frequencies in either mode could be different, ie either MODE A or MODE B could be FDMA (frequency division multiple access), as in GSM. Also, the receive and transmit frequency bands could be the same, ie time division duplex, as in DECT.

A dual mode TDMA radio telephone usually carries out measurements in its receive radio channels to determine which is more likely to offer the better performance. This is normally carried out by measuring the received power in each receive slot and for each frequency. This information is then either used by the telephone to set up radio links or else transmitted to the base station for use thereby.

In addition to the received signal strength information, the CCT 200 uses its own knowledge of where its modes are transmitting in time to avoid temporal overlap or coincidence, so-called temporal clashes. To provide this function, the microprocessor 210 incorporates an additional control entity or module 212 (FIG. 2) in the form of a temporal clash predictor. To this control entity 212, information is sent regarding which time slots are in use. The control entity or module 212 then sends to each mode control information indicating in which time slots a temporal clash is predicted.

The CCT 200 thus predicts the temporal coincidence of receive and transmit slots from the two modes and then takes avoiding action or utilises knowledge of probable error in some other way. The process involves:

a) prediction of a temporal clash, and b) avoiding action or damage limitation.

Considering first prediction of a temporal clash, in the general case it must be assumed that the timing of the modes are relatively asynchronous. Clashes may appear to be relatively random but the CCT 200 has knowledge of the timing of each mode. The CCT 200 predicts when transmission occurs in each mode. The CCT 200 can then determine whether a certain time has a transmission from each of the modes by testing the condition.

$$NTf+To<t<NTf+To+Tslot \quad \text{(Equation 1)}$$

where

N: Integer 0,1,2 . . . (any integer)

Tf: Frame time

To: A time offset, a constant t: Time for applying test

Tslot: Slot duration

If a given time fits this condition then a transmission is occurring.

The prediction may be carried out for both modes or just for one mode, depending on the counter-measures employed.

Figure 4:
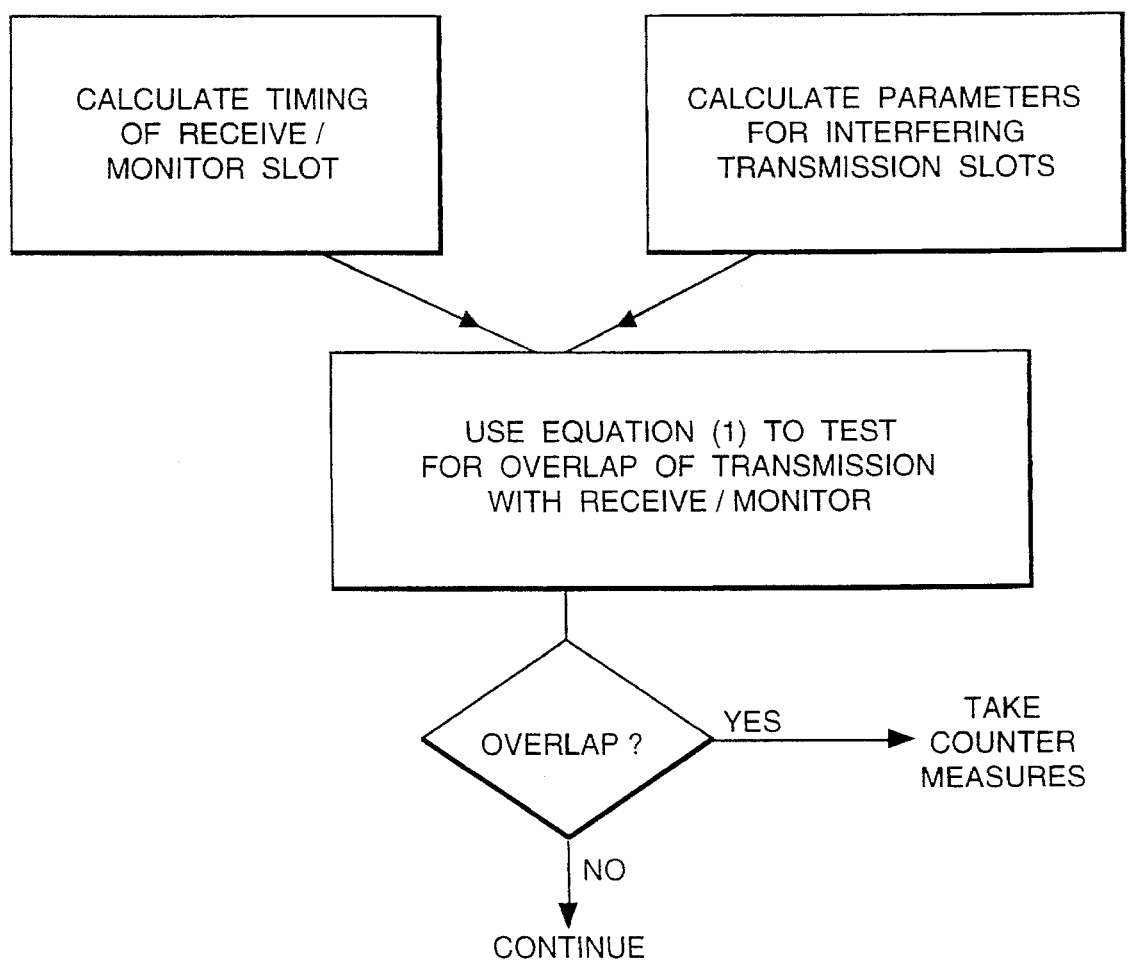
FIGS. 4 to 6 are logic diagrams illustrating how a microprocessor of the radio telephone predicts time slot interference and reduces its deleterious effects on signal quality.

The logic steps carried out by the additional control entity or module 212 of the microprocessor 210 are illustrated in the diagram of FIG. 4 which shows how the module 212 utilises Equation 1 above.

Figure 5:
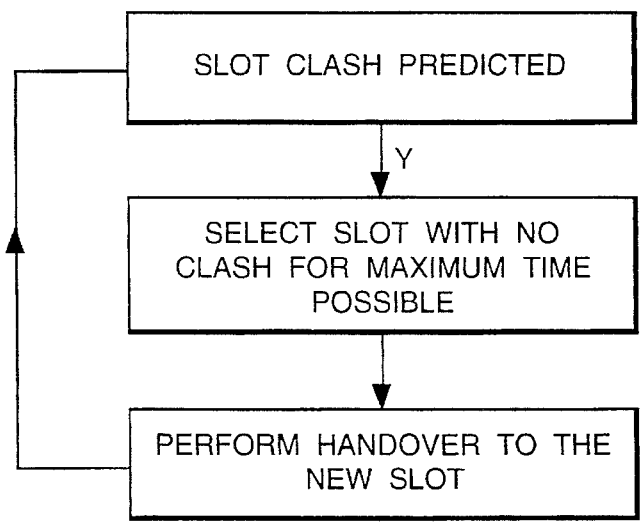

The avoidance of temporal clashes is particularly suitable for radio interfaces employing dynamic channel allocation (DCA) controlled by the CCT 200. This is where the communication channels are selected by the CCT 200 and the radio channel supports rapid re-allocation. The prediction of a time clash will normally be made by the CCT 200 well in advance, to enable the DCA algorithms performed in the microcontroller to change to a new slot position. That new slot position is selected to give the maximum time before another temporal clash occurs. The affected communication is then handed over to the newly selected slot. This particular counter-measure is best suited to the case where slot clashes are less frequent. This particular logic sequence, carried out in the control entity or module of the microprocessor, is illustrated in FIG. 5.

Instead of changing to a new slot position, the CCT 200 may operate to reduce the extent of interference. Following prediction of a clash, this method uses the information to reduce the perceived effect to the equipment user. The method actually utilised will depend upon the communication structure, for example if bit interleaving between different frames is used then the method will be different than if it is not. Two examples are given.

The first example relates to a system with no interleaving of bits between the frames, eg DECT. In this case, if a clash is detected and it is known that clashes reduce speech quality, then that frame may be deleted and replaced with a repetition of the last received word. Alternatively, a mute word could be sent to the speech codec.

Figure 6:
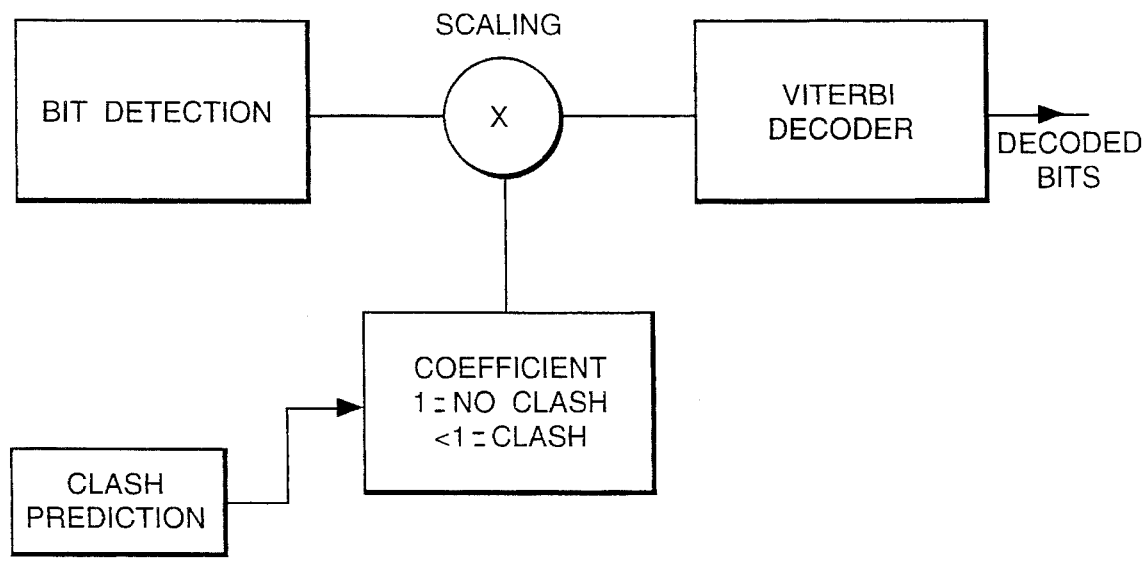

The second example concerns a system employing interleaving and correction coding with soft decision inputs, eg GSM. In this case, the bits received in the predicted corrupted slot are scaled by a factor to indicate their lack or reliability. The code is then corrected by use of the Viterbi algorithm, as illustrated in FIG. 6.

What I claim is:

1. A radio telephone operative in two radio telephone systems in each of which transmission and reception occur in time slots, the radio telephone comprising first means for predicting the temporal overlap or coincidence of receive and transmit slots in the two systems and second means, responsive to the first means, for avoiding or reducing the interference consequent upon the predicted overlap or coincidence.

2. A radio telephone according to claim 1, wherein the radio telephone operates in TDMA.

3. A radio telephone according to claim 1, wherein the radio telephone is responsible for making channel selection.

4. A radio telephone according to claim 1, wherein the second means are operative to alter the time slots in which transmission or reception occurs to avoid the incidence of overlap or coincidence.

5. A radio telephone according to claim 1, wherein the second means utilise knowledge of the predicted overlap or coincidence to reduce the effect of interference.

6. A radio telephone according to claim 5, wherein the second means are operative to effect muting in the time slots during which interference is predicted to occur.

7. A radio telephone according to claim 5, wherein the second means are operable to repeat signals in a previous time slot or slots.

8. A radio telephone according to claim 7, wherein the first and second means are incorporated in a microprocessor of the radio telephone.

9. In combination, a micro-cellular telephone system, a macro-cellular telephone system, in each system transmission and reception occurring in time slots, and at least one radio telephone capable or operating in either system, the combination comprising first means for predicting the temporal overlap or coincidence of receive and transmit slots in the two systems and second means, responsive to the first means, for avoiding or reducing the interference consequent upon the predicted overlap or coincidence.

10. A method of operating a radio telephone which is operative in two telephone systems in each of which transmission and reception occur in time slots, comprising predicting the temporal overlap or coincidence of receive and transmit slots in the two systems and using the prediction to avoid or reduce the interference consequent upon the predicted overlap or coincidence.

\* \* \* \* \*